(12) United States Patent
Krohmer et al.

(10) Patent No.: US 8,074,962 B1
(45) Date of Patent: Dec. 13, 2011

(54) DUST COLLECTION BLAST GATE WITH MOUNT

(75) Inventors: Steven Krohmer, Coon Rapids, MN (US); Daniel Banasik, Eagan, MN (US)

(73) Assignee: Rockler Companies, Inc., Medina, MN (US)

( * ) Notice: Subject to any disclaimer, the term of this patent is extended or adjusted under 35 U.S.C. 154(b) by 654 days.

(21) Appl. No.: 12/177,363

(22) Filed: Jul. 22, 2008

(51) Int. Cl.
*F16K 51/00* (2006.01)

(52) U.S. Cl. .................. 251/146; 251/326; 251/329

(58) Field of Classification Search ............ 251/148, 251/150, 326, 327, 328, 329; 137/343, 356
See application file for complete search history.

(56) References Cited

U.S. PATENT DOCUMENTS

| | | | |
|---|---|---|---|
| D211,826 S | 7/1968 | Hamrick | |
| 3,860,038 A * | 1/1975 | Forni | 138/94.3 |
| 3,907,341 A * | 9/1975 | Schoepe | 285/236 |
| 4,473,212 A | 9/1984 | Kensington et al. | |
| 4,483,509 A * | 11/1984 | Lewcock et al. | 251/86 |
| 4,591,369 A | 5/1986 | Stewart, Sr. et al. | |
| D314,848 S | 2/1991 | Foldes | |
| D316,893 S | 5/1991 | Glodowski | |
| D323,376 S | 1/1992 | Fukuchi | |
| 6,010,115 A * | 1/2000 | Schlegel et al. | 251/327 |
| 6,234,007 B1 * | 5/2001 | Pampinella | 73/49.8 |
| 6,422,535 B1 * | 7/2002 | Stone et al. | 251/327 |
| D463,634 S | 9/2002 | Mantyla et al. | |
| 6,451,078 B2 | 9/2002 | Berfield et al. | |
| 7,146,677 B2 | 12/2006 | Litomisky et al. | |
| 7,152,271 B2 | 12/2006 | Pfautz | |
| 2002/0077057 A1 | 6/2002 | Frink | |
| 2004/0093683 A1 | 5/2004 | Wallace | |
| 2008/0308472 A1 | 12/2008 | Osiensky et al. | |

OTHER PUBLICATIONS

Blast Gate—Pivoting—Woodworking Dust Collection, by Schreiber Bike; http://sketchup.google.com/3dwarehouse/details?mid=3c3c86f6258d97552331b5d5dd1cf817&prevstart=0; (one page), publically available at least as of Feb. 29, 2008.
Sawmill Creek—Woodworkers Forums, post by John Schreiber, Nov. 20, 2007; http://www.sawmillcreek.org/showthread.php?p=696740#poststop; (4 pages) and enlargements of three photos in post (3 pages).
Sawmill Creek—Woodworkers Forums, post by Doug Shepard, "New Lee Valley Remote Self-Cleaning Blastgates for PVC", May 24, 2007; http://www.sawmillcreek.org/showthread.php?t=58586; (5 pages).
6" Dust Collector Blast Gate—Direct Tool Mount; http://sketchup.google.com/3dwarehouse/details?mid=12ee7200999732c516280872e3277da9&prevstart=0; (one page), publically available at least as of Feb. 28, 2008.
Woodworker's Supply, Inc., Spring 2008 Catalog #232, cover and pp. 214-217 (5 pages).
Rockler Woodworking and Hardware, Feb. 2008 Catalog, cover and p. 153 (2 pages).
Sawmill Creek—Woodworkers Forums, post by Jameel Abraham, "My New Unique Blast Gates", Nov. 17, 2007; http://www.sawmillcreek.org/showthread.php?p=696740#poststop; (7 pages) and enlargement of four photos in post (4 pages).

* cited by examiner

*Primary Examiner* — John Fristoe, Jr.
(74) *Attorney, Agent, or Firm* — Altera Law Group, LLC (57) ABSTRACT

A blast gate assembly for connecting two hoses includes a first cylindrical section for frictionally engaging with a first flexible vacuum hose, a second cylindrical section for frictionally engaging with a second flexible vacuum hose, and a valve section disposed between the first cylindrical section and the second cylindrical section. The valve section includes a mounting bracket.

18 Claims, 9 Drawing Sheets

DUST COLLECTION BLAST GATE WITH MOUNT

BACKGROUND

Many woodworking tools, including joiners and planers, for example, create copious amounts of sawdust and airborne dust. Dust collection assemblies have been designed for woodworking to vacuum up dust particles to increase a user's respiratory comfort and allow for clear visibility of the object being worked upon. In some configurations, flexible hoses are used to direct suction capacity from a vacuum source to an end use location. In many woodworking environments, such flexible hoses have a diameter of about 4 inches.

Some woodworking dust collections assemblies are set up as a central vacuum assembly with hoses directed to each of a plurality of end use locations. Valves may be used on each of these hoses to quickly turn the suction on and off at each desired location. One configuration of a vacuum valve is a blast gate configured to connect two flexible hoses end-to-end. In one configuration, a blast gate has an interior sliding panel that is moved between an opened and closed position, as desired by a user. However, because the hoses to which the blast gate is connected are flexible, such panel movement (particularly when done manually) may cause undesirable play in the assembly, which can lead to loosened hose connections, operation difficulty, and stress on the components.

BRIEF SUMMARY

In one aspect, a blast gate assembly for connecting two hoses includes a first cylindrical section for frictionally engaging with a first flexible vacuum hose, a second cylindrical section for frictionally engaging with a second flexible vacuum hose, and a valve section disposed between the first cylindrical section and the second cylindrical section. The valve section includes a mounting bracket.

In another aspect, a blast gate assembly for connecting two hoses includes a first cylindrical section for frictionally engaging with a first flexible vacuum hose, a second cylindrical section for frictionally engaging with a second flexible vacuum hose, and a sliding gate section disposed between the first cylindrical section and the second cylindrical section. The sliding gate section includes a mounting bracket.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION OF ILLUSTRATIVE EMBODIMENTS

Figure 1:
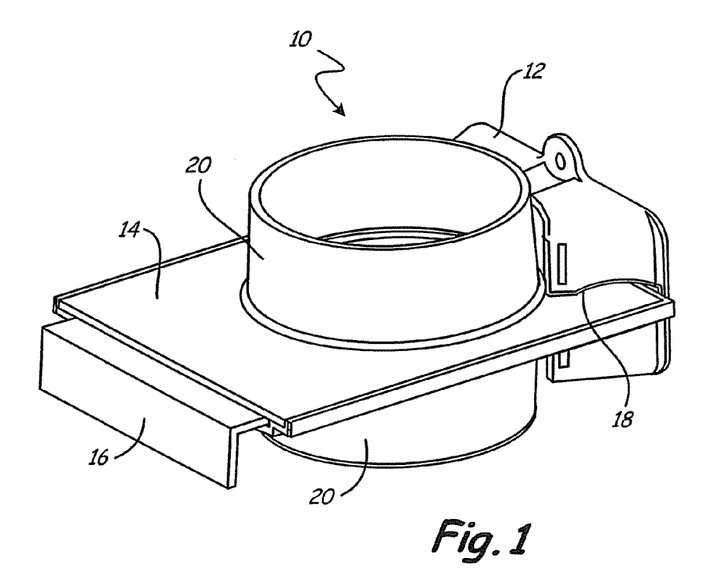
FIG. 1 is a perspective view of a first exemplary embodiment of a blast gate with a mount.

FIG. 1 is a perspective view of a first exemplary embodiment of a blast gate and mount assembly 10. Bracket or mount 12 is used with blast gate 14 to securely attach blast gate 14 to a structure and thereby prevent movement of assembly 10 when door 16 of blast gate 14 is opened and closed. In the illustrated embodiments, blast gate 14 is inserted into slot 18 of mount 12. Blast gate 14 includes hose fittings 20 for the attachment of flexible hoses to blast gate 14. Blast gate 14 may be formed of metal, plastic, or a combination of materials.

Figure 2:
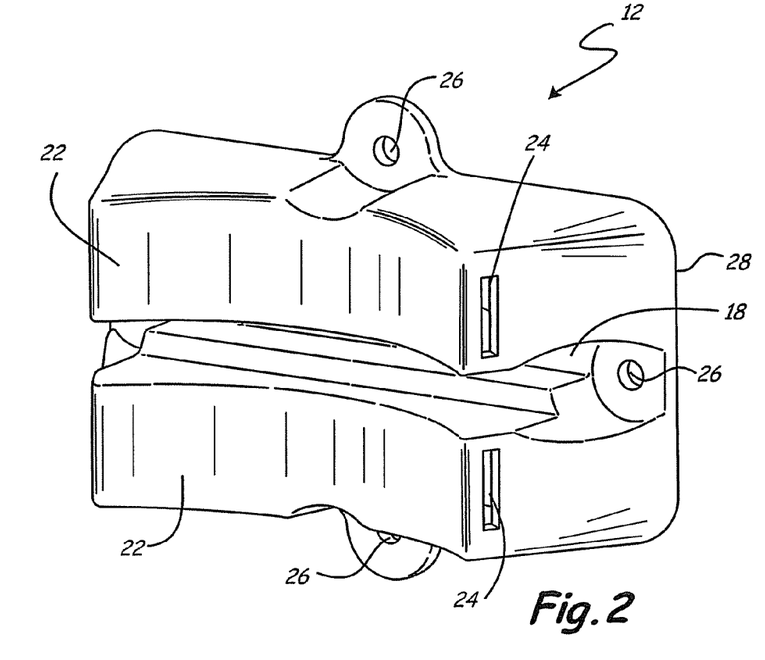
FIG. 2 is a perspective view of the mount of FIG. 1 with the blast gate removed.

FIG. 2 is a perspective view of mount 12 with blast gate 14 removed. In an exemplary embodiment, mount 12 is molded or otherwise formed from a lightweight and durable material such as plastic. A particularly suitable plastic material is acrylonitrile-butadiene-styrene (ABS). In the illustrated embodiment, mount 12 includes two arcuate surfaces 22 that accommodate (but are spaced from) cylindrical hose fittings 20 of blast gate 14, as shown in FIG. 1. Slots 24 are provided on each side of mount 12 proximate arcuate surfaces 22 to allow hose clamp bands to pass therethrough, thereby feeding the hose clamp bands through the body of mount 12. In one embodiment, holes 26 are provided in a base 28 of mount 12 to allow for the use of screws or other attachment means to fasten mount 12 onto a structure or surface. Multiple holes 26 provide numerous mounting options.

Figure 3:
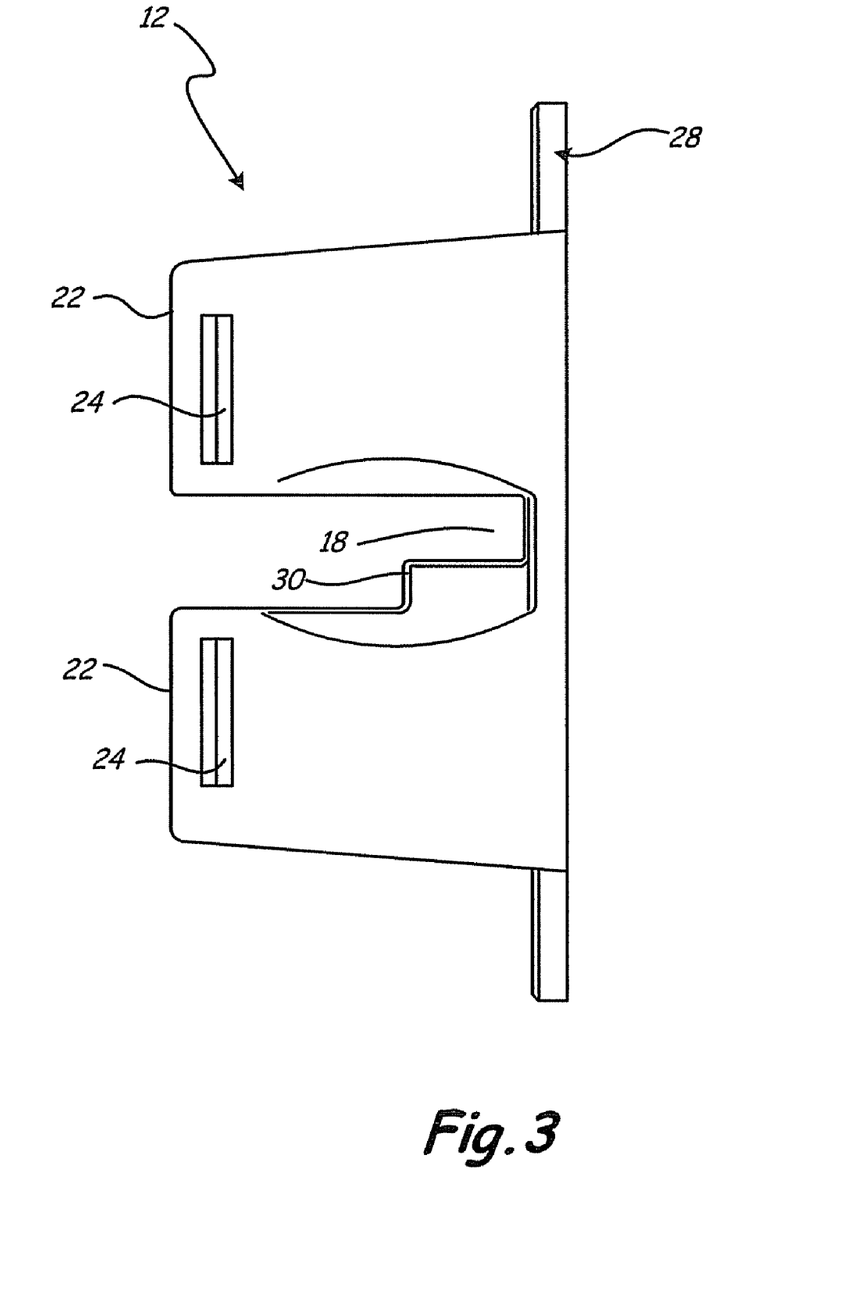
FIG. 3 is a right side elevation view of the mount of FIG. 2.

FIG. 3 is a right side elevation view of the mount 12 of FIG. 2. Because mount 12 is symmetrical in an exemplary embodiment, the left side is simply a mirror image of the right side view. In the illustrated embodiment, slots 18 includes step 30 to accommodate the geometry of some blast gate 14 configurations.

Figure 4:
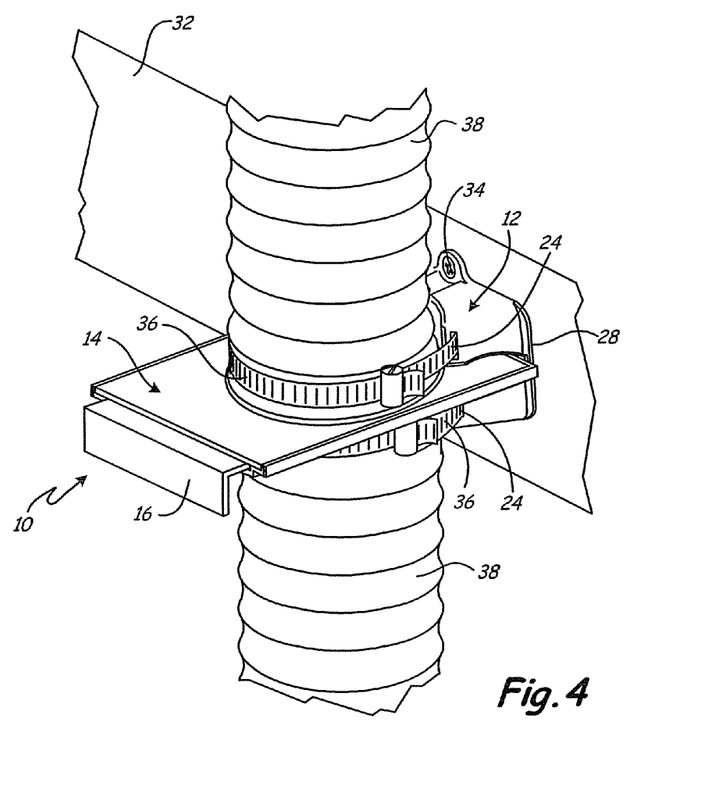
FIG. 4 is similar to FIG. 1, but shows the blast gate and mount connected to two flexible hoses and a structure such as a wall stud.

FIG. 4 is a perspective view of blast gate and mount assembly 10 secured on structure 32 with screws 34 inserted through holes 26 of base 28. To obtain the configuration shown in FIG. 4, a mount as shown in FIG. 2 is secured to structure 32 by screws 34 or other fasteners. In an exemplary embodiment, structure 32 is a fixed structure, such as a portion of a wall, floor, ceiling, or work bench. Mount 12 may be secured to structure 32 in any orientation that positions base 28 onto a surface of structure 32.

Then, blast gate 14 is inserted into slot 18 of mount 12, as depicted in FIG. 1. Thereafter, adjustable band-type hose clamps 36 are threaded through slots 24 of mount 12, and ends of flexible hoses 38 are fitted over each hose fitting 20, within a hose clamp 36 for each flexible hose 38. Each hose clamp 36 is tightened around its respective flexible hose 38 to frictionally engage the flexible hose 38 to hose fitting 20. Each hose clamp 36 thereby secures its respective hose fitting 20 to mount 12 to thereby affix the blast gate 14 to the mount 12.

Because blast gate 14 is secured by mount 12 to structure 32, the assembly 10 does not move when a user opens and closes door 16 of blast gate 14. Mount 12 may be used as a retrofit part for mounting a separate blast gate 14; such a blast gate 14 alone would not be mountable to a structure or surface.

In another method of use, mount 12 may be used without a blast gate in order to secure a flexible hose 38 to structure 32. In that case, mount 12 is secured to structure 32. Hose clamp 36 is fed through slots 24 of mount 12. Flexible hose 38 is secured by hose clamp 36 to mount 12, thereby securing flexible hose 38 to structure 32. The same method may also to be used secure a pipe or other component to mount 12.

Figure 5:
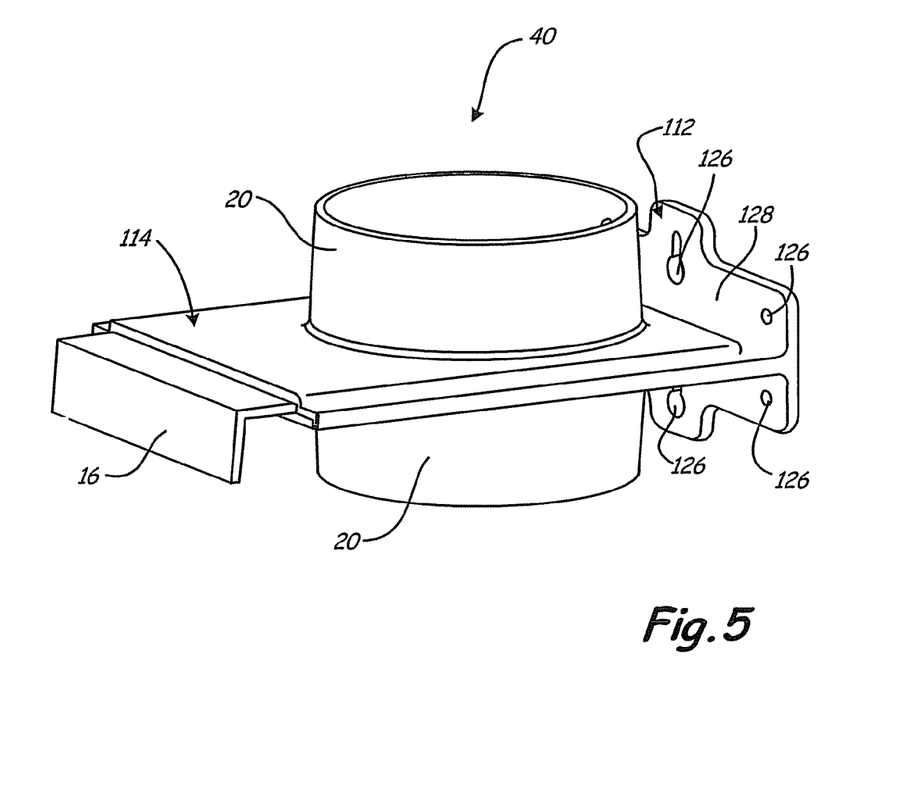
FIG. 5 is a perspective view of a second exemplary embodiment of a blast gate with a mount.

FIG. 5 is a perspective view of a second exemplary embodiment 40 of a blast gate with an integral bracket assembly. In an exemplary embodiment, blast gate with integral bracket 40 is molded or otherwise formed from a lightweight and durable material such as plastic. A particularly suitable plastic material is acrylonitrile-butadiene-styrene (ABS). This integral construction offers added strength and stability. Parts of assembly 40 that are similar to parts of assembly 10 are numbered similarly, such as blast door 16 and hose fittings 20. Blast gate with integral bracket assembly 40 has mount 112 connected to blast gate 114. Mount 112 has holes 126 in a base 128 thereof for securing assembly 40 via screws or other attachment means onto a structure or surface. Multiple holes 126 provide numerous mounting options.

Figure 6:
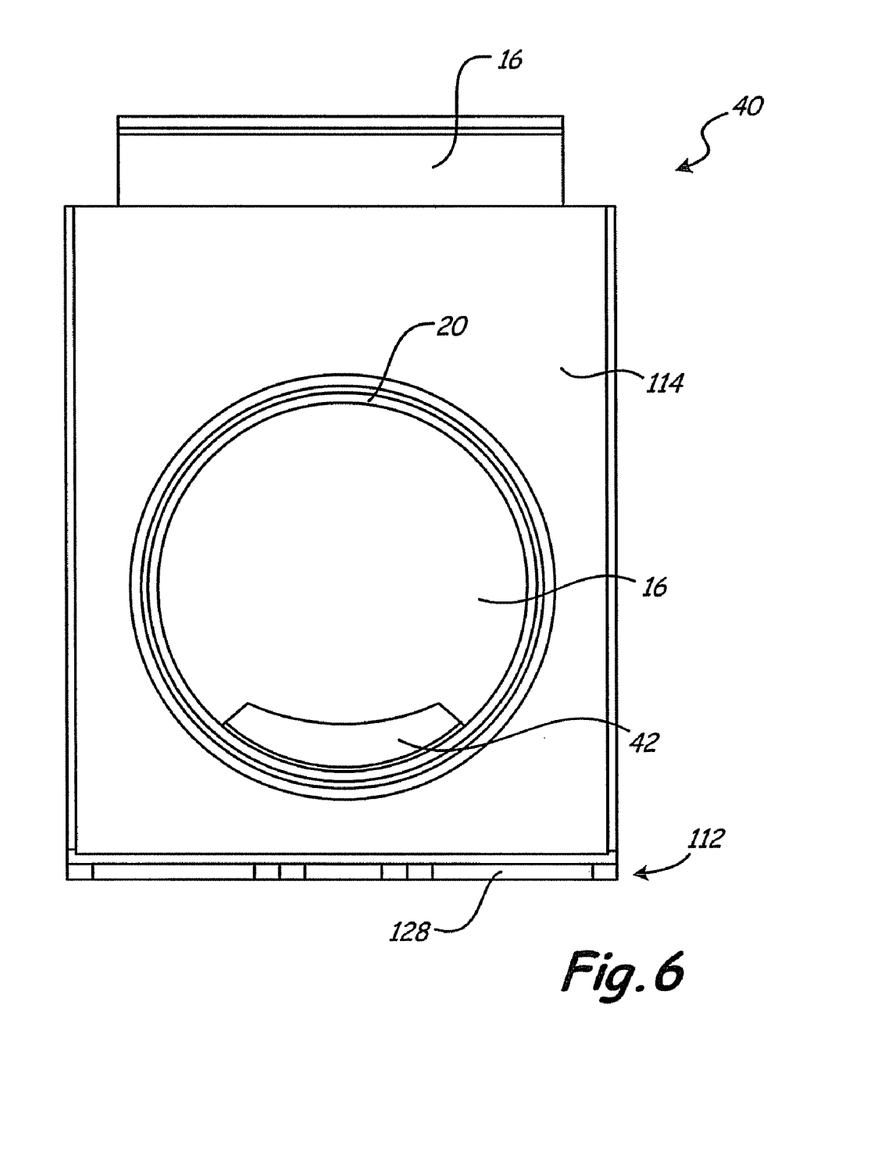
FIG. 6 is an orthogonal view of the blast gate and bracket assembly of FIG. 5, with the sliding panel partially opened.
Figure 7:
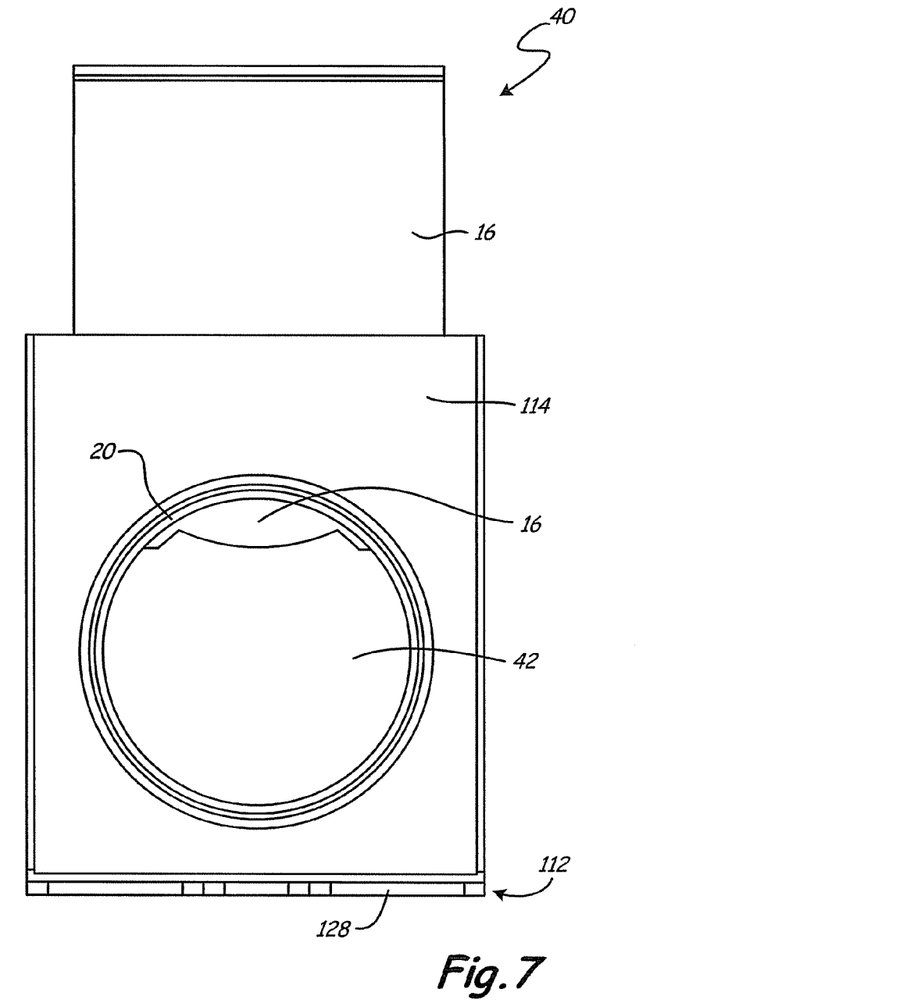
FIG. 7 is similar to FIG. 6, but shows the sliding panel fully opened.
Figure 8:
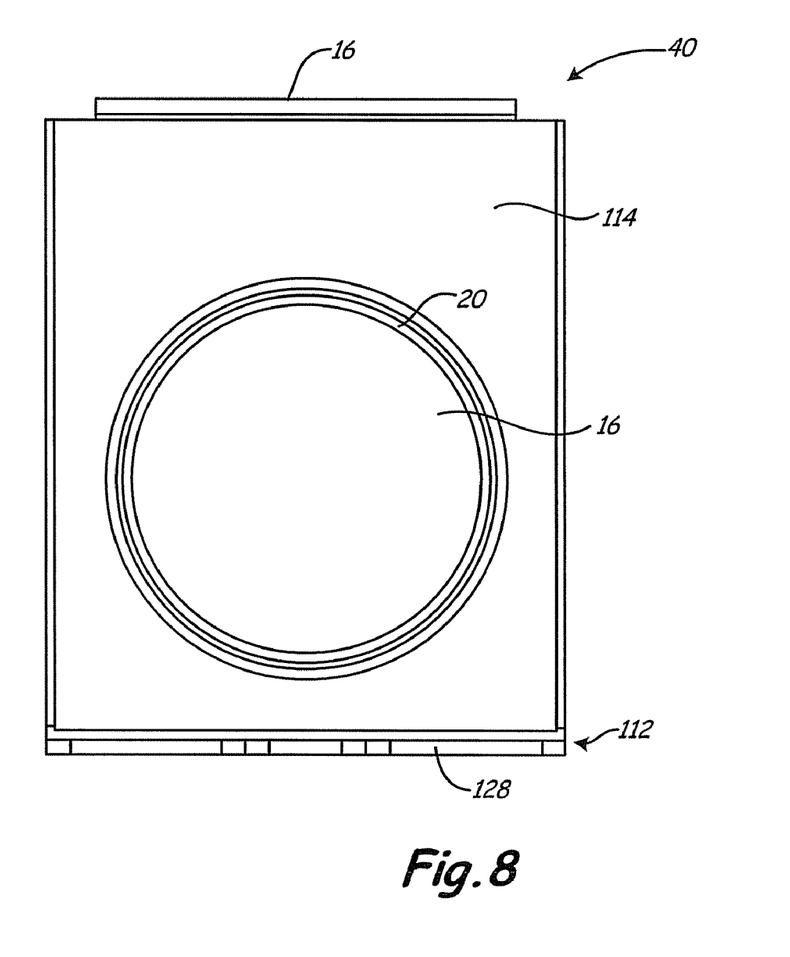
FIG. 8 is similar to FIG. 6, but shows the sliding panel fully closed.

FIG. 6 is a top orthogonal view of assembly 40 of FIG. 5, showing door 16 partially open to expose aperture 42, which allows air to pass therethrough. FIG. 7 is similar to FIG. 6, but shows door 16 fully opened so that aperture 42 allows maximum air flow therethrough. FIG. 8 is similar to FIG. 6, but shows door 16 completely closed, thereby preventing airflow through blast gate assembly 40. It is to be understood that blast gate 14 of assembly 10 works in the same manner as the blast gate 114 of assembly 40, just described.

Figure 9:
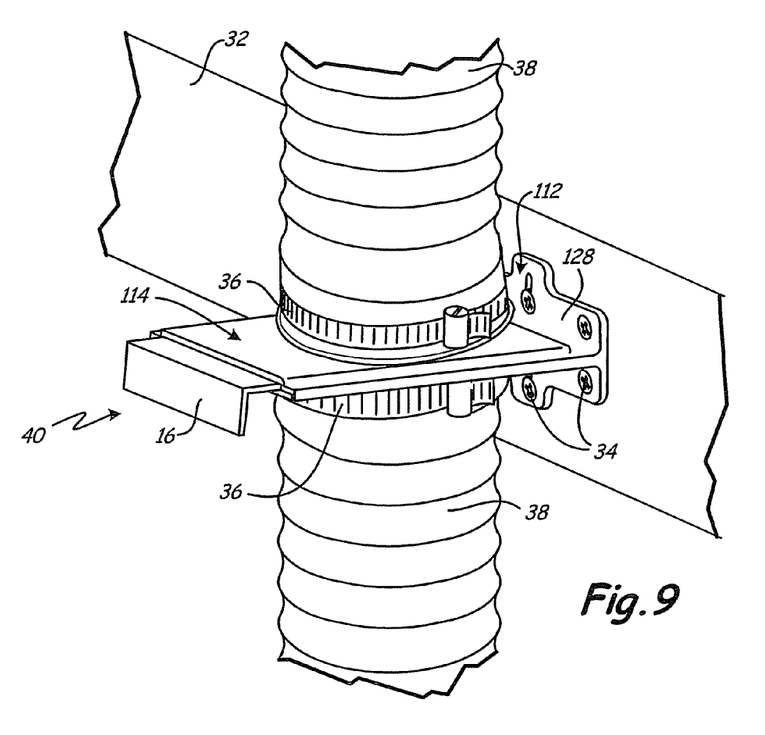
FIG. 9 is a perspective view of the embodiment of FIG. 5, showing the blast gate and mount connected to two flexible hoses and a structure such as a wall stud.

FIG. 9 is a perspective view of the blast gate with integral bracket assembly 40 mounted on a structure 32 and having two flexible hoses 38 attached to hose fittings 20 by hose clamps 36. In this instance, since the mount 112 is already affixed to the blast gate 114 (e.g., integral with it), the hose clamps 36 do not serve the function of affixing the mount to the blast gate, but merely serve to secure each flexible hose 38 to its respective hose fitting 20 on the blast gate 114.

Although the present invention has been described with reference to preferred embodiments, workers skilled in the art will recognize that changes may be made in form and detail without departing from the spirit and scope of the invention.

What is claimed is:

1. A blast gate assembly for connecting two hoses comprising:
    a first cylindrical section for frictionally engaging with a first flexible vacuum hose;
    a second cylindrical section for frictionally engaging with a second flexible vacuum hose; and
    a valve section disposed between the first cylindrical section and the second cylindrical section, the valve section comprising a mounting bracket and
        wherein the mounting bracket is removably attached to the valve section, and
        wherein the valve section comprises a plate into and out of which the gate slides; and
        wherein the mounting bracket comprises a groove into which an edge of the plate fits.

2. The assembly of claim 1 wherein the valve section comprises a sliding gate.

3. The assembly of claim 2 wherein the valve section comprises a plate into and out of which the gate slides, the plate being rectangular.

4. The assembly of claim 1:
    wherein the plate being rectangular.

5. The assembly of claim 1 wherein the mounting bracket comprises a first arcuate surface adjacent to which the first cylindrical section fits.

6. The assembly of claim 5 wherein the mounting bracket comprises a second arcuate surface adjacent to which the second cylindrical section fits.

7. The assembly of claim 1 wherein the mounting bracket is integrally formed with the valve section.

8. The assembly of claim 7 wherein the valve section comprises a plate into and out of which the gate slides, the plate being rectangular.

9. The assembly of claim 8 wherein the mounting bracket is oriented perpendicular to the plate.

10. The assembly of claim 1 further comprising a first clamp that secures the first hose to the first cylindrical section.

11. The assembly of claim 10 wherein the first clamp comprises a first adjustable band.

12. The assembly of claim 10 further comprising a second clamp that secures the second hose to the second cylindrical section.

13. The assembly of claim 12 wherein the second clamp comprises a second adjustable band.

14. A blast gate assembly for connecting two hoses comprising:
    a first cylindrical section for frictionally engaging with a first flexible vacuum hose;
    a second cylindrical section for frictionally engaging with a second flexible vacuum hose; and
    a valve section disposed between the first cylindrical section and the second cylindrical section, the valve section comprising a mounting bracket and further comprising a first clamp that secures the first hose to the first cylindrical section and
    wherein the first clamp further secures the first cylindrical section to the mounting bracket.

15. A blast gate assembly for connecting two hoses comprising:
    a first cylindrical section for frictionally engaging with a first flexible vacuum hose;
    a second cylindrical section for frictionally engaging with a second flexible vacuum hose; and
    a valve section disposed between the first cylindrical section and the second cylindrical section, the valve section comprising a mounting bracket and further comprising a first clamp that secures the first hose to the first cylindrical section and a second clamp that secures the second hose to the second cylindrical section and
    wherein the second clamp further secures the second cylindrical section to the mounting bracket.

16. A blast gate assembly for connecting two hoses comprising:

a first cylindrical section for frictionally engaging with a first flexible vacuum hose;

a second cylindrical section for frictionally engaging with a second flexible vacuum hose; and a sliding gate section disposed between the first cylindrical section and the second cylindrical section, the sliding gate section comprising a mounting bracket and wherein the mounting bracket is removably attached to the sliding gate section, wherein the sliding gate section comprises a plate into and out of which a gate slides, and wherein the mounting bracket comprises a groove into which an edge of the plate fits.

17. The assembly of claim 16:

wherein, the plate being rectangular.

18. The assembly of claim 16 wherein the mounting bracket is integrally formed with the sliding gate section.

* * * * *